United States Patent

Esposito et al.

[11] Patent Number: 5,884,963
[45] Date of Patent: Mar. 23, 1999

[54] FRONT SUSPENSION CROSS-MEMBER TO TORQUE BOX ENERGY MANAGEMENT AND TOE BOARD INTRUSION LIMITER

[75] Inventors: Scott A. Esposito, Rochester Hills; Michael H. Tsai, Waterford; James Chapp, Jr., W. Bloomfield, all of Mich.

[73] Assignee: DaimlerChrysler Corporation, Auburn Hills, Mich.

[21] Appl. No.: 718,757

[22] Filed: Sep. 23, 1996

[51] Int. Cl.[6] ................................................ B62D 21/15
[52] U.S. Cl. ........................................... 296/189; 280/784
[58] Field of Search ........................... 296/189; 280/784; 180/274

[56] References Cited

U.S. PATENT DOCUMENTS

| | | |
|---|---|---|
| 2,860,720 | 11/1958 | Huff et al. . |
| 3,689,104 | 9/1972 | Graham . |
| 3,860,284 | 1/1975 | Lichtig . |
| 3,904,237 | 9/1975 | Barenyi et al. . |
| 3,940,176 | 2/1976 | Ito et al. . |
| 4,781,398 | 11/1988 | Uebelstadt et al. ..................... 280/784 |
| 4,789,199 | 12/1988 | Komatsu . |
| 4,804,222 | 2/1989 | Sakiyama et al. . |
| 4,892,350 | 1/1990 | Kijima . |
| 5,251,932 | 10/1993 | Ide ..................................... 296/204 X |
| 5,308,115 | 5/1994 | Ruehl et al. ............................ 280/785 |
| 5,381,871 | 1/1995 | Ohta ..................................... 296/189 X |
| 5,454,453 | 10/1995 | Meyer et al. ............................ 280/795 |
| 5,605,353 | 2/1997 | Moss et al. .......................... 296/189 X |
| 5,681,057 | 10/1997 | Whirley et al. ..................... 296/189 X |

*Primary Examiner*—Joseph D. Pape
*Attorney, Agent, or Firm*—Roland A. Fuller, III

[57] ABSTRACT

A vehicle structure is provided for absorbing energy caused by a front end collision. An energy dissipating bracket is mounted to the torque box and engages a wedge member which is attached to a front suspension cross member. Rearward movement of the front suspension cross member relative to the vehicle passenger compartment causes engagement of the wedge member with the energy dissipating bracket. The energy dissipating bracket absorbs the energy from the cross member and deflects the cross member downward underneath the passenger compartment.

11 Claims, 1 Drawing Sheet

FRONT SUSPENSION CROSS-MEMBER TO TORQUE BOX ENERGY MANAGEMENT AND TOE BOARD INTRUSION LIMITER

BACKGROUND OF THE INVENTION

FIELD OF THE INVENTION

The present invention relates to a body structure for automotive vehicles, and more particularly, to an energy absorbing body structure for limiting toe-board intrusion in the vehicle passenger compartment.

BACKGROUND AND SUMMARY OF THE INVENTION

In severe frontal impacts, especially in smaller vehicles, there may not be enough energy absorbing structure forward of the occupants to dissipate all of the crash energy. In this scenario, passenger compartment intrusion, especially in the toe-board area, is the likely result. Any passenger compartment intrusion is undesirable since the likelihood of occupant injuries increases as intrusion increases.

As cars become smaller and move towards a more "cab forward" design, the length of available crush space for frontal impacts decreases. The result is less crush space to absorb the same amount of energy. At the same time, the impact requirements governed by law are moving toward higher speed protection as well as toward partial or offset barrier impacts, both of which substantially increase the amount of energy the vehicle structure must absorb. If the additional energy is not absorbed by the front rail structure, the energy is dissipated through the suspension cross-member into the torque box resulting in toe-board intrusion into the passenger compartment. Toe-board intrusion greatly increases the likelihood of lower extremity injuries.

To increase the energy absorption of the front rails, either the size of the rail section or the gauge of the rails must be increased, or reinforcements must be added. It is nearly impossible to increase the size of the section due to the tight packaging constraints of these newer designs. Increasing the gauge and/or adding reinforcements adds weight to the vehicle which, in a small car, is usually not a desirable alternative due to fuel economy requirements.

Accordingly, it is the intention of this invention to make available more crush space by sliding non-crushable components (i.e. the front suspension cross member), under the passenger compartment through an energy dissipating device.

The present invention provides a body structure for a vehicle including a cross member extending transversely across the vehicle. A torque box is disposed above the cross member, the torque box having a slot formed therein. An energy dissipation bracket is attached to the torque box above the slot and a wedge member is attached to the cross member by a shaft member. The shaft member passes through the slot in the torque box and supports the wedge member at one end of the energy dissipation bracket. During a front end collision, the cross member moves rearward relative to the torque box causing interference between the wedge member and the energy dissipation bracket. The interference provides the needed energy dissipation, without inducing toe-board intrusion. The energy dissipation bracket, along with the shape of the bottom plate of the torque box, guide the cross member downward away from the toe-board of the vehicle passenger compartment.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
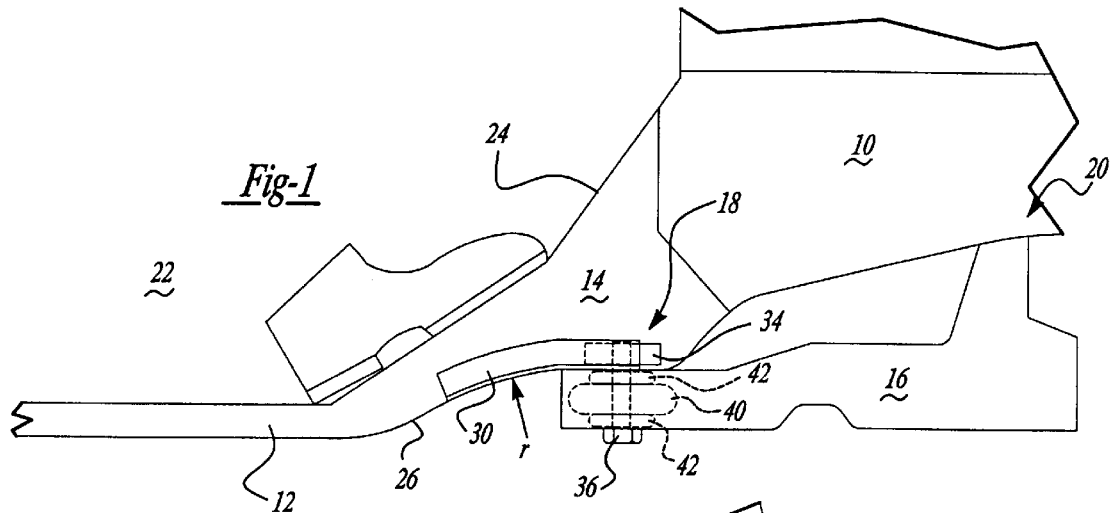
FIG. 1 is a side view of the energy dissipating body structure according to the principles of the present invention.
Figure 2:
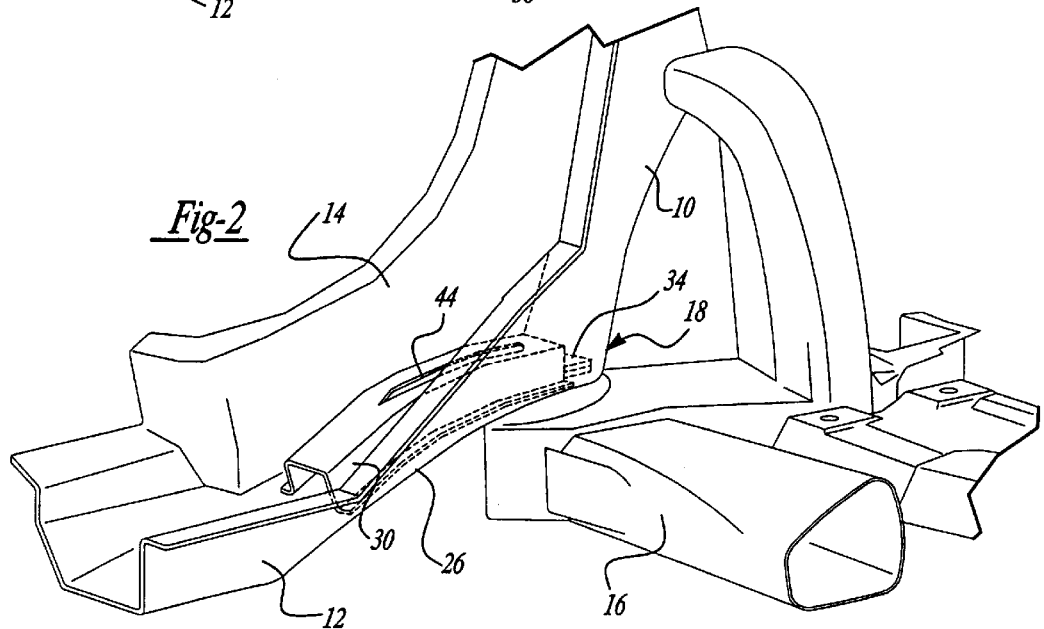
FIG. 2 is a perspective view of the energy dissipating body structure according to the principles of the present invention.
Figure 3:
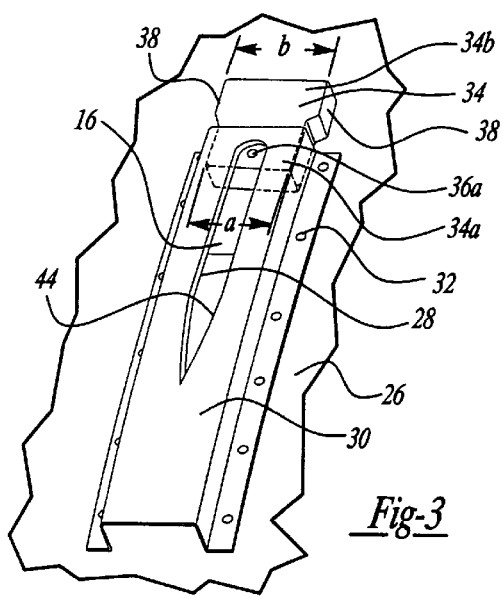
FIG. 3 is a top view of the energy dissipation bracket engaged by the wedge member.
Figure 4:
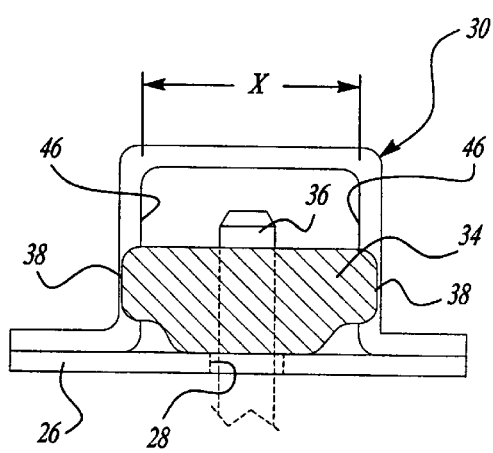
FIG. 4 is an end view of the wedge member as it is received in an end of the energy dissipation bracket.

With reference to FIGS. 1–4, the present invention will now be described. First, the general construction of the vehicle body will be described. The main impact energy absorbing members in a vehicle are typically the front longitudinal rails 10. These closed sections generally stop at the dash panel and taper to the sills and underbody rail extensions 12 through a member referred to as the torque box 14. The front suspension cross member 16 generally attaches to the body at two places per side, 18, 20. The frontal attachment point 20 is usually somewhere on the mid-position of the front rails 10, and the rear attachment 18 is generally at the rear of the front rails 10 or in the area of the torque box 14.

The vehicle passenger compartment 22 is provided with a toe-board 24 disposed above torque box 14. The toe-board 24 defines the floor of the front of the passenger compartment 22.

Torque box 14 is provided with a bottom plate 26 having a slot 28 formed therein at rear attachment point 18. An energy dissipating bracket 30 is attached to bottom plate 26 above slot 28. Energy dissipating bracket 30 has a hat-shaped section and is fastened to the bottom plate 26 by a series of welds, rivets, or other fastening means 32.

A wedge member, such as wedge tapping nut 34, is attached to the cross member 16 by a shaft member such as bolt 36. Wedge tapping nut 34 is provided with a pair of wedge-shaped side walls 38. Bolt 36 connects front suspension cross member 16 to suspension control arm 40 and is provided with a pair of rubber bushings 42 disposed between control arm 40 and cross member 16.

Energy dissipating bracket 30 is optionally provided with a slot 44 in an upper surface thereof. Slot 44 is provided for receiving an end 36a of bolt 36 which extends through wedge tapping nut 34. Energy dissipating bracket 30 is also provided with a pair of side walls 44 which are spaced apart from one another a dimension "x" greater than a first diameter "a" of a first end 34a of wedge tapping nut 34. The dimension "x" between side walls 44 is narrower than a diameter "b" of a second end 34b of wedge tapping nut 34.

The bottom plate 26 of torque box 14 should have a shape that allows unimpinged rearward movement of the suspension cross member 16. In other words, the bottom plate 26 can have a slight curvature "r" or can be provided with a slight downward slope. In a forward collision, the slot 28 allows the suspension cross member 16 to move rearward (relative to the torque box 14). As the wedge nut 34 moves relative to energy dissipating bracket 30, the clamp force between wedge nut 34 and energy dissipating bracket 30 provides needed energy dissipation and deflection of the cross member under the passenger compartment, without inducing toe-board intrusion.

According to the preferred embodiment of the present invention, the wedge nut 34 is provided with wedge-shaped side walls which engage relatively parallel side walls 46 of energy dissipating bracket 30. However, it is noted that the objects of the present invention may also be obtained by providing wedge-shaped side walls on opposite sides of energy dissipating bracket 30 while the wedge nut 34 can have relatively straight side walls.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A body structure for a vehicle, comprising:

a cross member extending transversely across a vehicle;

a torque box disposed above said cross member;

an energy dissipation bracket attached to said torque box, said bracket having a pair of opposing side walls spaced at a desired distance from one another; and a wedge member attached to said cross member, said wedge member being supported at one end of said energy dissipation bracket with a first portion in said bracket and having a second portion with a width greater than the distance between said side walls;

wherein a front end collision causes said cross member to move rearward relative to said torque box thereby causing said wedge member second portion to engage said side walls of said energy dissipation bracket.

2. A body structure for a vehicle, comprising:

a cross member extending transversely across a vehicle;

a torque box disposed above said cross member, said torque box having a slot formed therein;

an energy dissipation bracket attached to said torque box above said slot, said bracket having a pair of opposing side walls spaced at a desired distance from one another; and a wedge member attached to said cross member by a shaft member, said shaft member passing through said slot and supporting said wedge member at one end of said energy dissipation bracket with a first portion in said bracket and having a second portion with a width greater than the distance between said side walls.

3. The body structure according to claim 2, wherein said energy dissipation bracket includes a pair of sidewalls and an open first end and said wedge member is disposed in said open first end of said energy dissipation bracket.

4. The body structure according to claim 2, wherein said wedge member has a pair of side walls which engage a pair of sidewalls of said energy dissipation bracket when said cross member moves rearward relative to said torque box caused by a vehicle collision.

5. The body structure according to claim 2, wherein said shaft member is a bolt.

6. A motor vehicle, comprising:

a passenger compartment having a toe board disposed in a front portion thereof;

a body structure including:

a cross member extending transversely across said vehicle forward of said toe board;

a torque box disposed above said cross member and below said toe board, said torque box having a slot formed therein;

an energy dissipation bracket attached to said torque box above said slots, said bracket having a pair of opposing side walls spaced at a desired distance from one another; and a wedge member attached to said cross member by a shaft member, said shaft member passing through said slot and supporting said wedge member at one end of said energy dissipation bracket with a first portion in said bracket and having a second portion with a width greater than the distance between said side walls.

7. The vehicle according to claim 6, wherein said energy dissipation bracket includes a pair of sidewalls and an open first end and said wedge member is disposed in said open first end of said energy dissipation bracket.

8. The vehicle according to claim 6, wherein said wedge member has a pair of side walls which engage a pair of sidewalls of said energy dissipation bracket when said cross member moves rearward relative to said torque box caused by a vehicle collision.

9. The vehicle according to claim 6, wherein said shaft member is a bolt.

10. A body structure according to claim 1, wherein said bracket includes a base between said side walls, said base extending downward wherein upon a collision said cross member moves under a passenger compartment.

11. A body structure according to claim 2, wherein said bracket includes a base between said side walls, said base extending downward wherein upon a collision said cross member moves under a passenger compartment.

* * * * *